US007558833B2

(12) United States Patent
Sherwood

(10) Patent No.: US 7,558,833 B2
(45) Date of Patent: Jul. 7, 2009

(54) METHOD AND SYSTEM FOR SELECTIVELY FORWARDING ELECTRONIC-MAIL

(75) Inventor: Amy L. Sherwood, Marietta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 794 days.

(21) Appl. No.: 10/441,804

(22) Filed: May 20, 2003

(65) Prior Publication Data

US 2004/0236837 A1    Nov. 25, 2004

(51) Int. Cl.
G06F 15/16  (2006.01)
(52) U.S. Cl. .................. 709/207; 709/206; 709/232; 709/238; 709/245; 713/201
(58) Field of Classification Search ......... 709/206–207, 709/232, 245
See application file for complete search history.

(56) References Cited

U.S. PATENT DOCUMENTS

| 5,937,161 | A  | * | 8/1999 | Mulligan et al. ............ 709/206 |
| 6,118,856 | A  | * | 9/2000 | Paarsmarkt et al. ....... 379/93.24 |
| 6,427,164 | B1 | * | 7/2002 | Reilly ........................ 709/206 |
| 6,438,583 | B1 | * | 8/2002 | McDowell et al. .......... 709/206 |
| 6,654,779 | B1 | * | 11/2003 | Tsuei ......................... 718/101 |
| 7,110,510 | B1 | * | 9/2006 | Shaffer et al. ............ 379/88.25 |
| 2002/0023138 | A1 | * | 2/2002 | Quine et al. ................. 709/206 |
| 2003/0005064 | A1 |   | 1/2003 | McDowell et al. |
| 2003/0009698 | A1 | * | 1/2003 | Lindeman et al. ........... 713/201 |

OTHER PUBLICATIONS

NetZero and Juno Internet Services Offer TrueSwitch to Consumers to Make the Jump to its Value-Priced ISP's Easier, |online|; |retrieved on Jun. 24, 2005|; retrieved from the Internet http://www.esoya.com/news/pr040804.html.
http://pcworld.shopping.yahoo.com/yahoo/article/0,aid,100324,00.asp (3 pages).
http://www.returnpath.net/how_it_works/ (1 page).

* cited by examiner

Primary Examiner—William C Vaughn, Jr.
Assistant Examiner—Mohamed Ibrahim
(74) Attorney, Agent, or Firm—Cantor Colburn LLP

(57) ABSTRACT

A method for selectively forwarding e-mail comprising receiving a first e-mail message at a first receiving host system from an originator at a sending host system. The first e-mail message is addressed to a recipient at a first mailbox on the first receiving host system. A transfer list is searched for the first mailbox and a corresponding second mailbox address in response to a determination that the first mailbox is not active on the first receiving host system. The transfer list includes the first mailbox and the corresponding second mailbox address if the recipient had requested that the first mailbox and the corresponding second mailbox address be added to the transfer list via a first user interface screen from a second Internet service provider. Forwarding instructions are analyzed to determine if the first e-mail message should be forwarded to the second mailbox address. The analyzing is performed in response to the first mailbox and the second mailbox address being located on the transfer list. Input to the analyzing includes the identity of the originator and the forwarding instructions were created by the recipient via a second user interface screen from the second Internet service provider. The first e-mail message is forwarded to the second mailbox address in response to the analyzing resulting in a determination that the e-mail message should be forwarded to the second mailbox address. A second e-mail message is transmitted to the originator at the sending host system in response to the forwarding, wherein the second e-mail message includes the second mailbox address.

21 Claims, 3 Drawing Sheets

(ISP Home Page)

("Pop-up" Window)

METHOD AND SYSTEM FOR SELECTIVELY FORWARDING ELECTRONIC-MAIL

BACKGROUND OF THE INVENTION

The present disclosure relates generally to selectively forwarding electronic-mail (e-mail) and in particular, to a method of automatically forwarding an e-mail message from one internet service provider (ISP) system to a mailbox on another ISP system based on instructions from the intended recipient of the message.

E-mail refers to the transmission of messages over communication networks such as the Internet. The messages may be notes entered from the keyboard or electronic files stored on disk. Most mainframes, minicomputers and computer networks have an e-mail system. Some e-mail systems are confined to a single computer system or network, but others have gateways to other computer systems, enabling users to send e-mail anywhere in the world. Companies that are fully computerized make extensive use of e-mail because it is fast, flexible and reliable. Sent messages are stored in electronic mailboxes until the intended recipient fetches them. A user may have to check an electronic mailbox periodically to see if any e-mail has arrived or alternatively, the e-mail system may alert the user when new e-mail is received. Many on-line services and Internet service providers (ISPs) offer e-mail and most also support gateways so that a user may exchange mail with users on other ISP systems. Typically, it takes only a few seconds or minutes for mail to arrive at its destination. E-mail is a particularly effective way to communicate with a group because the user can broadcast a message or document to everyone in the group at once.

The competition for e-mail customers is increasing as more and more companies are getting into the on-line services and ISP businesses (e.g., telephone companies, cable companies). New pricing plans and usage plans are being announced and made available to customers on a regular basis. Customers want to be able to select an ISP based on the best prices and plans. Currently, however, it may be cumbersome to change ISPs because it is the responsibility of the e-mail address owner, or recipient, to manually give a new e-mail address to the various parties who have the recipient's existing e-mail address. Another way this is currently handled is for the customer to keep the old account open for a period of time with an automatic reply message that will render the new information to anyone who e-mails the user. This approach may be expensive for the customer.

BRIEF DESCRIPTION OF THE INVENTION

One aspect of the present invention is a method for selectively forwarding e-mail. In an exemplary embodiment, the method comprises receiving a first e-mail message at a first receiving host system from an originator at a sending host system. The first e-mail message is addressed to a recipient at a first mailbox on the first receiving host system. A transfer list is searched for the first mailbox and a corresponding second mailbox address in response to a determination that the first mailbox is not active on the first receiving host system. The transfer list includes the first mailbox and the corresponding second mailbox address if the recipient had requested that the first mailbox and the corresponding second mailbox address be added to the transfer list via a first user interface screen from a second Internet service provider. Forwarding instructions are analyzed to determine if the first e-mail message should be forwarded to the second mailbox address. The analyzing is performed in response to the first mailbox and the second mailbox address being located on the transfer list. Input to the analyzing includes the identity of the originator and the forwarding instructions were created by the recipient via a second user interface screen from the second Internet service provider. The first e-mail message is forwarded to the second mailbox address in response to the analyzing resulting in a determination that the e-mail message should be forwarded to the second mailbox address. A second e-mail message is transmitted to the originator at the sending host system in response to the forwarding, wherein the second e-mail message includes the second mailbox address.

In another aspect, a system for selectively forwarding e-mail comprises a network and a storage device in communication with the network. The system further comprises a user system in communication with the network, a sending host system in communication with the network, a second receiving host system in communication with the network and a first receiving host system in communication with the network. The first receiving host system includes application software to implement a method. The method comprises receiving a first electronic mail message at the first receiving host system from an originator on the user system in communication with the sending host system via the network. The first electronic mail message is addressed to a recipient at a first mailbox on the first receiving host system. A transfer list located on the storage device is searched for the first mailbox and a corresponding second mailbox address in response to a determination that the first mailbox is not active on the first receiving host system. The transfer list includes the first mailbox and the corresponding second mailbox address if the recipient had requested that the first mailbox and the corresponding second mailbox address be added to the transfer list via a first user interface screen from a second Internet service provider. Forwarding instructions located on the storage device are analyzed to determine if the first electronic mail message should be forwarded to the second mailbox address at the second receiving host system. The analyzing is performed in response to the first mailbox and the second mailbox address being located on the transfer list. Input to the analyzing includes the identity of the originator and the forwarding instructions were created by the recipient via a second user interface screen from the second Internet service provider. The first electronic mail message is forwarded to the second mailbox address in response to the analyzing resulting in a determination that the first electronic mail message should be forwarded to the second mailbox address. A second electronic mail message is transmitted to the originator at the sending host system in response to the forwarding. The second electronic mail message includes the second mailbox address.

In a further aspect, a computer program product for forwarding e-mail comprises a storage medium readable by a processing circuit and storing instructions for execution by the processing circuit for performing a method comprising receiving a first e-mail message at a first receiving host system from an originator at a sending host system. The first e-mail message is addressed to a recipient at a first mailbox on the first receiving host system. A transfer list is searched for the first mailbox and a corresponding second mailbox address in response to a determination that the first mailbox is not active on the first receiving host system. The transfer list includes the first mailbox and the corresponding second mailbox address if the recipient had requested that the first mailbox and the corresponding second mailbox address be added to the transfer list via a first user interface screen from a second Internet service provider. Forwarding instructions are analyzed to determine if the first e-mail message should be forwarded to the second mailbox address. The analyzing is performed in response to the first mailbox and the second mailbox address being located on the transfer list. Input to the analyzing includes the identity of the originator and the forwarding instructions were created by the recipient via a second user interface screen from the second Internet service provider. The first e-mail message is forwarded to the second mailbox address in response to the analyzing resulting in a determination that the e-mail message should be forwarded to the second mailbox address. A second e-mail message is transmitted to the originator at the sending host system in response to the forwarding, wherein the second e-mail message includes the second mailbox address.

BRIEF DESCRIPTION OF THE DRAWINGS

Referring to the exemplary drawings wherein like elements are numbered alike in the several FIGURES.

DETAILED DESCRIPTION OF THE INVENTION

A method of selectively forwarding e-mail is presented that allows an e-mail user to have the capability of communicating a new e-mail address to certain parties who send e-mail messages to an old e-mail address. The e-mail message is forwarded to the new e-mail address even if the old e-mail address has been deactivated. An exemplary embodiment of the present invention allows the e-mail user to set parameters, or forwarding instructions, so that the new e-mail address is not sent to selected e-mail originators such as SPAM originators. In addition, the e-mail user may set parameters so that SPAM and messages from other selected e-mail users do not get forwarded to the new e-mail address.

Figure 1:
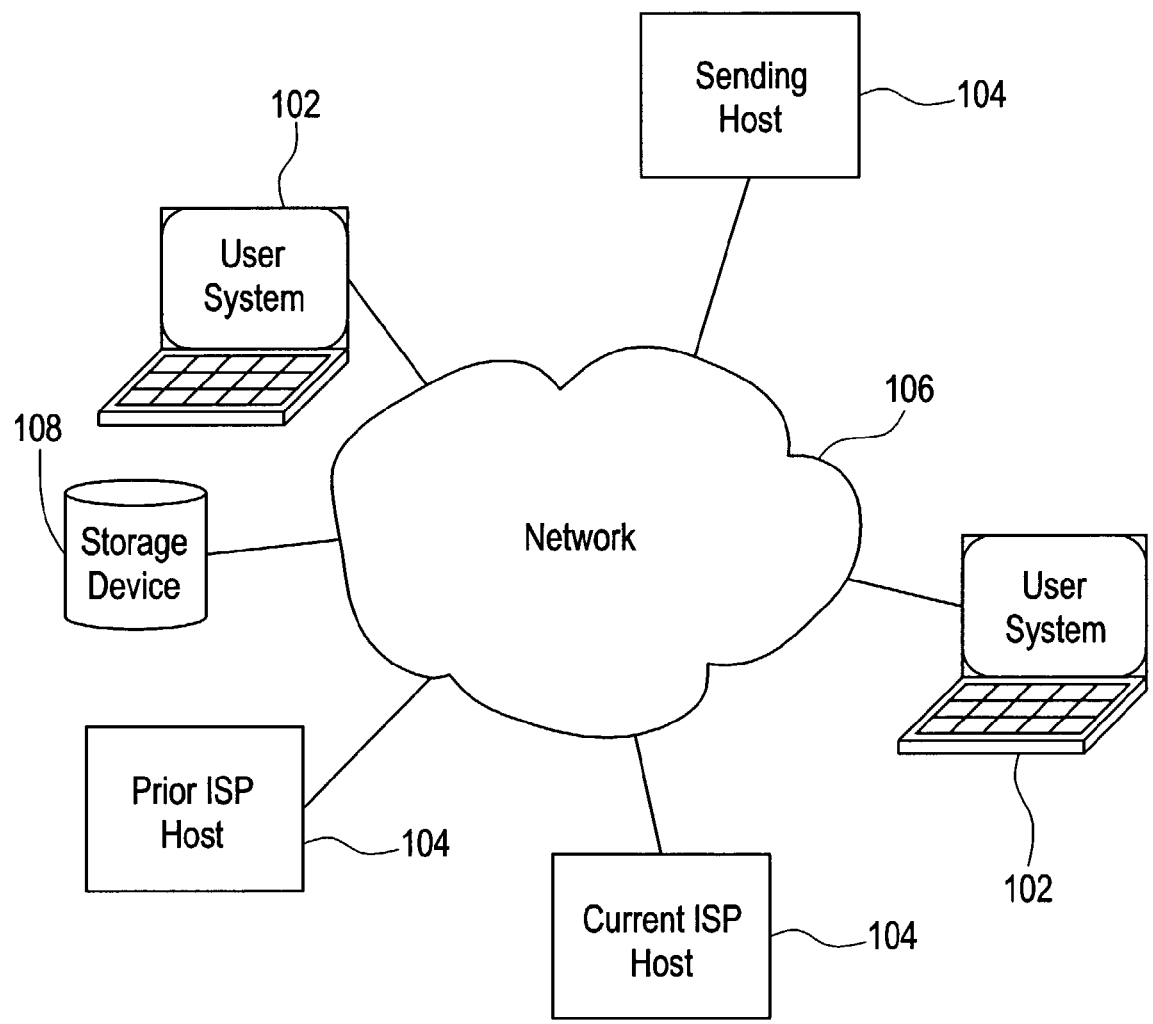
FIG. 1 is a block diagram of an exemplary system for selectively forwarding e-mail.

In FIG. 1, a block diagram of an exemplary system for forwarding e-mail is generally shown. The system includes one or more user systems 102 through which users at one or more geographic locations may contact host systems 104 to initiate the sending and receiving of e-mail messages. The user systems 102 are coupled to the host systems 104 via a network 106. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a public switched telephone network (PSTN) a local area network (LAN), a global network (e.g. Internet), a virtual private network (VPN), and an intranet. The network 106 may be implemented using a wireless network or any kind of physical network implementation known in the art. A user system 102 may be coupled to a host system 104 through multiple networks (e.g., intranet and Internet) so that not all user systems 102 are coupled to the host systems 104 through the same network. One or more of the user systems 102 and the host systems 104 may be connected to the network 106 in a wireless fashion.

The storage device 108 depicted in FIG. 1 may be implemented using a variety of devices for storing electronic information. It is understood that the storage device 108 may be implemented using memory contained in one or more of the host systems 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host systems 104. The storage device 108 includes a transfer list that contains a previous e-mail address and a corresponding current e-mail address for any e-mail users signed up for the e-mail forwarding service; and forwarding instructions corresponding to each recipient, or e-mail user, detailing which originators should be forwarded to the new e-mail address. The storage device 108 may also include other kinds of data such as information concerning the addition of new e-mail users to the transfer list and updates to the instructions (e.g., a user identifier, date, and time). In an exemplary embodiment of the present invention, the host systems 104 operate as database servers and coordinate access to application data including data stored on the storage device 108.

Each host system 104 depicted in FIG. 1 may be implemented using one or more servers operating in response to a computer program stored in a storage medium accessible by the server. The host systems 104 may operate as network servers (e.g., a web server) to communicate with the user systems 102. The host systems 104 handle sending and receiving information to and from the user systems 102 and can perform associated tasks. The host systems 104 may also include firewalls to prevent unauthorized access to the host systems 104 and enforce any limitations on authorized access. For instance, an administrator may have access to the entire system and have authority to modify portions of the system. A firewall may be implemented using conventional hardware and/or software as is known in the art.

The host systems 104 may also operate as application servers. The host systems 104 execute one or more computer programs to perform e-mail functions such as sending and receiving messages. Processing may be shared by the user systems 102 and the host systems 104 by providing an application (e.g., java applet) to the user systems 102. Alternatively, the user systems 102 may include stand-alone software applications for performing a portion or all of the processing described herein. As previously described, it is understood that separate servers may be utilized to implement the network server functions and the application server functions. Alternatively, the, network server, the firewall, and the application server may be implemented by a single server executing computer programs to perform the requisite functions.

An exemplary embodiment of the present invention includes: a sending host system 104, where the e-mail message is created by an originator; a first receiving host system 104, where the e-mail recipient had a previous account; and a second receiving host system 104, where the e-mail recipient currently has an account. The host systems 104 may be owned and operated by three different ISPs. Any e-mail system known in the art may be utilized with an exemplary embodiment of the present invention (e.g., Microsoft Outlook). An exemplary e-mail system may have two basic parts: a user agent application for interfacing with the e-mail user at a user system 102 and a message transfer agent application for moving messages from a sending host system 104 to a receiving host system 104.

Figure 2:
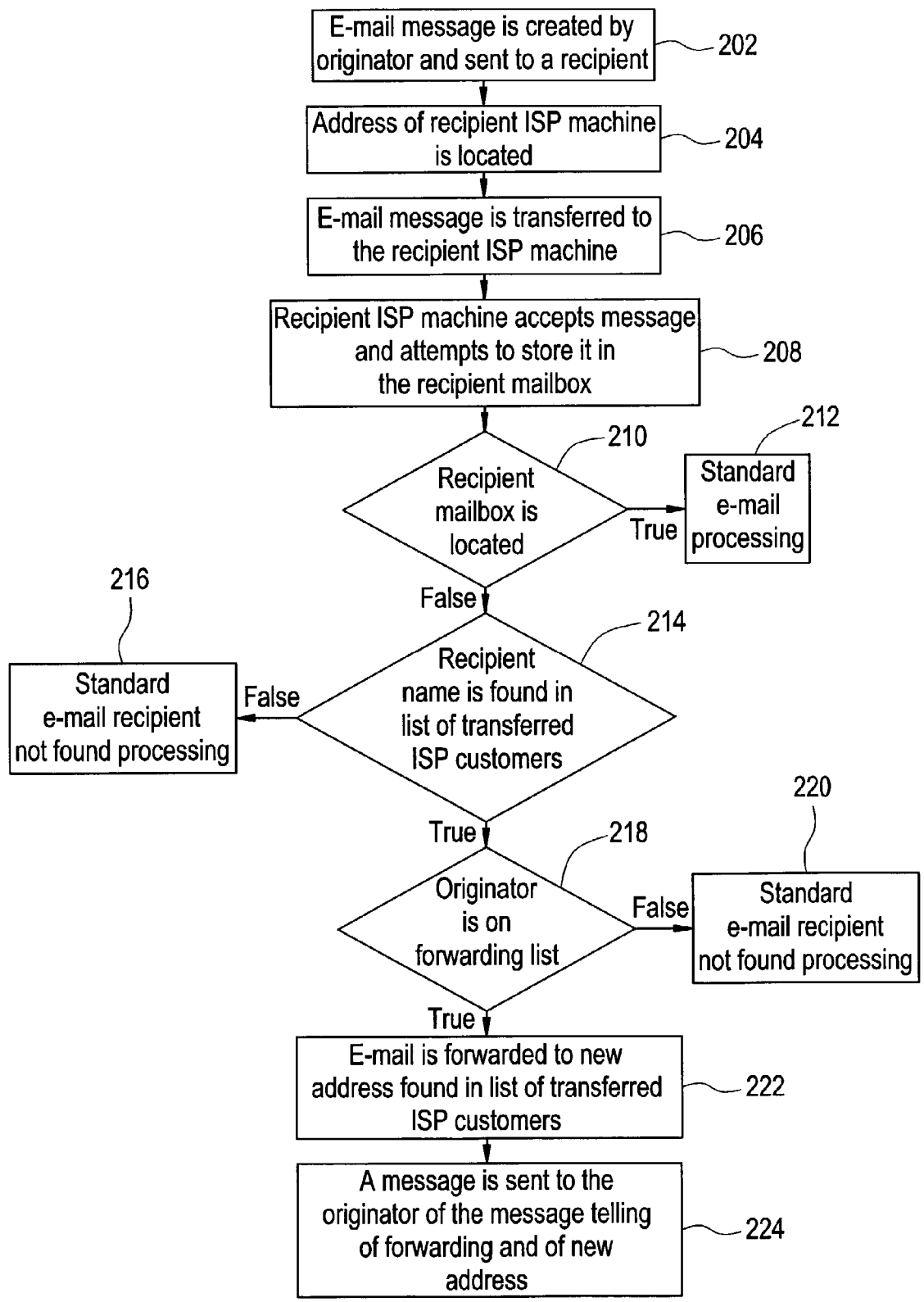
FIG. 2 is a flow diagram of an exemplary selective e-mail forwarding process.

FIG. 2 is a flow diagram of an exemplary embodiment of an e-mail forwarding process. At step 202, an e-mail message is created by an e-mail user, or originator, accessing the user agent application portion of an e-mail system via a user system 102 connected to a sending host system 104. Once the e-mail message has been created and the user has taken an action to send the e-mail message, the user agent application, located on the sending host system 104, passes the e-mail message to the message transfer agent application located on the sending host system 104. At step 204 the message transfer agent application begins the process of sending the e-mail message by looking up the address of the e-mail recipient (located at the first receiving host system 104) using the domain name system (DNS). Next, at step 206, the e-mail message is transferred to the first receiving host system 104. The message transfer agent application may perform this transferring by establishing a transmission control protocol (TCP) connection to a port on the first receiving host system 104. The message transfer agent application transfers the e-mail message to the first receiving host system 104 and then breaks the TCP connection. At step 208, a message transfer agent application located on the first receiving host system 104 then accepts the e-mail message and attempts to store it in the recipient mailbox. At step 210, a determination is made about whether the recipient mailbox is located on the first receiving host system 104. If the recipient mailbox is found on the first receiving host system 104, then step 212 is performed to continue standard e-mail processing.

If it is determined, at step 210, that the recipient mailbox is not located on the first receiving host system 104, then step 214 is performed. At step 214, it is determined if the recipient mailbox or name is found in a list of transferred customers. This transfer list along with application code to perform step 214 may be located on the storage device 108 and is accessible through the first receiving host system 104. Alternatively, the transfer list and associated code may be located on the first receiving host system 104, or the application code to perform step 214 may be located at the first receiving host system 104 and the transfer list located on the storage device 108. If the recipient mailbox or name is not found in the transfer list associated with the ISP service located on the receiving host system 104, then standard e-mail processing is performed at step 216.

If the recipient mailbox or name is found in the transfer list, then step 218 is performed to determine if the e-mail message should be forwarded to the recipient at a new mailbox address located on a second receiving host system 104. The new mailbox address is contained in the transfer list and corresponds to the recipient mailbox or name. This determination is made by analyzing the forwarding instructions provided by the recipient about what e-mail messages should be forwarded to the new mailbox address. The instructions given by the recipient, and described in more detail in reference to FIG. 4 below, describe forwarding rules in terms of the identity of the originator. The instructions and application code to perform the analysis may be located at one or more of the host system 104, the user system 102 and the storage device 108.

If it is determined at step 218 that the e-mail message from the originator should not be forwarded to the recipient, then standard e-mail processing is performed at step 220. Alternatively, if it is determined at step 218 that the e-mail message from the originator should be forwarded to the recipient at the new mailbox address, then step 222 is performed to forward the e-mail message to the second receiving host system 104 corresponding to the new mailbox address. In addition, a header message may be attached to the message to notify the recipient that forwarding and notification has occurred. At step 224, an e-mail message is sent to the originator of the e-mail message. The e-mail message lists the new mailbox address and tells the originator that his e-mail message has been forwarded to this new mailbox. The process described in reference to FIG. 2 is performed in a real time, or on-line, mode each time an individual e-mail is sent to a recipient who has a new mailbox address. In an alternate exemplary embodiment, the process is performed off-line in a batch mode, on a periodic basis.

Figure 3:
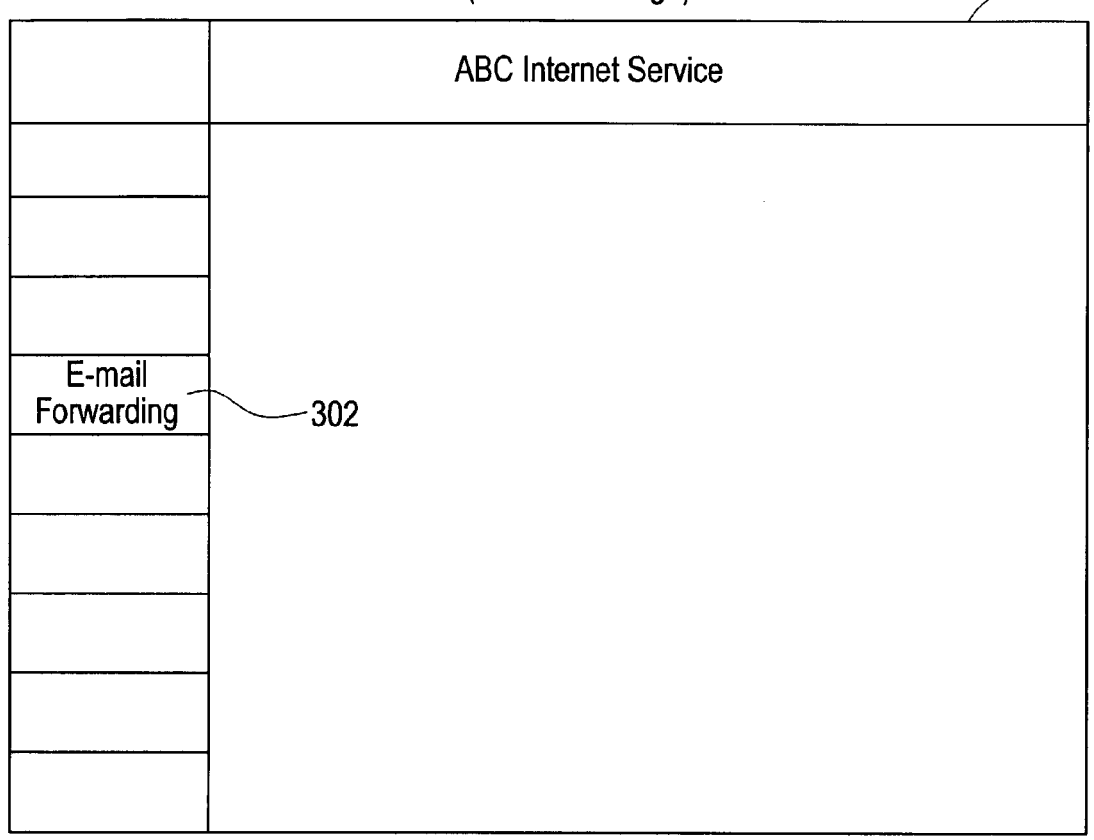
FIG. 3 is an exemplary user interface for initiating the selective forwarding of e-mail.
Figure 4:
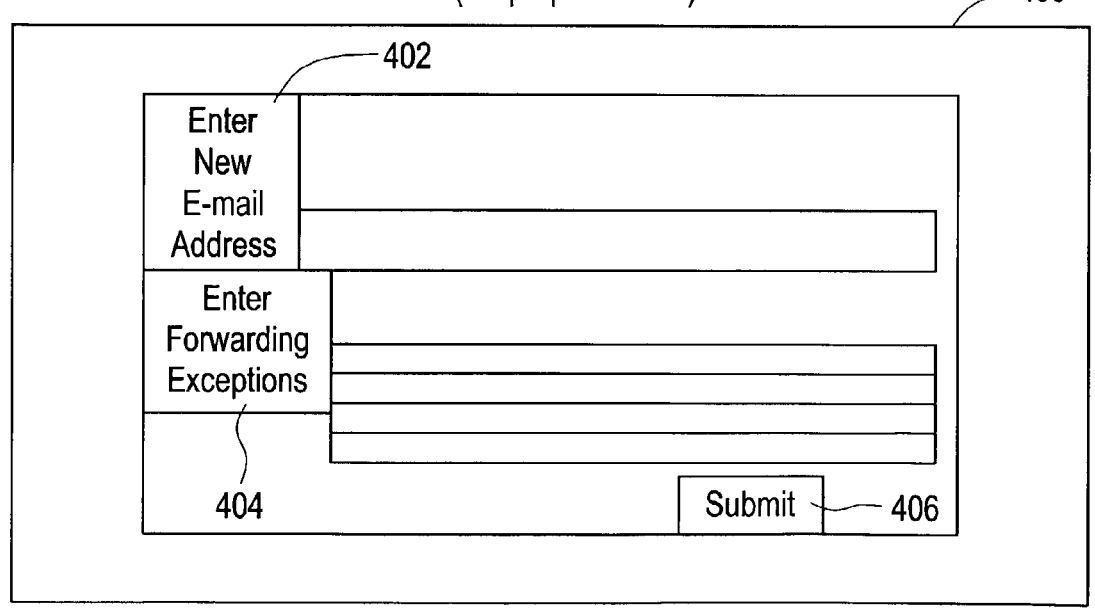
FIG. 4 is an exemplary user interface for setting up instructions for the selective forwarding of electronic mail.

FIG. 3 is a user interface for initiating the forwarding of electronic mail using an exemplary embodiment of the present invention. An option to perform the forwarding of e-mail is presented in a box 302 on the ISP home page 300 as depicted in FIG. 3. To initiate the e-mail intercept service, or e-mail forwarding service, the user would click on the box 302. As a result, another user interface screen would be presented to the user. FIG. 4 is an exemplary user interface 400 for setting up instructions for the forwarding of e-mail. The user enters the e-mail address to communicate as the new e-mail address on the first line 402. In addition, the user enters the previous e-mail addresses. The new e-mail address and previous e-mail address are added to the transfer list. The user also enters e-mail addresses to which they do not want the referral sent on other lines 404 provided on the user interface 400 screen. The information entered on lines 404 is utilized to create the forwarding instructions. In an exemplary embodiment of the present invention, the user clicks on a button 406 to submit the new e-mail address and to activate the forwarding feature on the ISP server system. The new e-mail address entered on the first line 402 would then be sent in response to all e-mails (as authorized by the e-mail user through the forwarding instructions) sent to the old e-mail address. The incoming e-mail would also be forwarded to the new e-mail address with a header message stating that the e-mail was forwarded from the old address and that the new e-mail address was communicated to the sender. This will continue to occur even after the old e-mail account/address has been closed.

Alternate exemplary embodiments of the present invention include different forwarding instruction formats such as the ability for the user to list all originators whose notes should get forwarded and who should be notified of the new mailbox address. For example, one hundred people may regularly send e-mail to a user who is switching to a new ISP and/or a new e-mail address. Of the one hundred people, the user may want ninety-nine of them to have the new e-mail address and may want one not to have the new e-mail address. In this case, the user would enter the e-mail address of the one person and specify that notes originated from the one user should not be forwarded and in addition, that a notification of the new e-mail address should not be sent to the one person. Alternatively, of the one hundred people, the user may want twenty of them to have the new e-mail address and eighty of them not to have the new e-mail address information. In this case, the user would enter the e-mail addresses of the twenty people and specify that notes originated from any of the twenty people should be forwarded to the user and that a notification of new e-mail address of the user should be sent to the e-mail originator (i.e., one of the twenty people). Other combinations are possible, for example, a user may specify that SPAM not be forwarded but that e-mail from a list of ten specific people should be forwarded.

An embodiment of the present invention allows an e-mail user to have the capability of communicating a new e-mail address to certain parties who send e-mails to an old e-mail address. This may result in the e-mail user not losing any e-mail messages due to the originator not being aware of the new e-mail address and allows the user to have control over which originators receive the new e-mail address. This may also make it easier for an e-mail user to switch to different ISPs on a regular basis because it removes the job of notifying each potential originator about a new e-mail address. The forwarding instructions and transfer list are created by the e-mail user through a user interface screen supplied by the ISP that provides the new e-mail address. This is convenient for the e-mail user and allows the e-mail user to tailor the forwarding instructions and transfer list based on the e-mail messages received.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method for selectively forwarding electronic mail, the method comprising:
   receiving a first electronic mail message at a first receiving host system from an originator at a sending host system, wherein said first electronic mail message is addressed to a recipient at a first mailbox on said first receiving host system;
   searching a transfer list for said first mailbox and a corresponding second mailbox address in response to a determination that said first mailbox is not active on said first receiving host system, wherein said transfer list includes said first mailbox and said corresponding second mailbox address if said recipient had requested that said first mailbox and said corresponding second mailbox address be added to said transfer list via a first user interface screen from a second Internet service provider;
   analyzing forwarding instructions to determine if said first electronic mail message should be forwarded to said second mailbox address, wherein said analyzing is performed in response to said first mailbox and said second mailbox address being located on said transfer list, and said forwarding instructions were created by said recipient via a second user interface screen from said second Internet service provider;
   the analyzing forwarding instructions being responsive to the identity of the originator of the first electronic mail message, wherein if the originator is not on a forwarding list the first electronic mail message is processed as if the recipient is not found, and if the originator is on the forwarding list the first electronic mail message is determined to be forwarded to the second mailbox address;
   forwarding said first electronic mail message to said second mailbox address in response to said analyzing resulting in a determination that said first electronic mail message should be forwarded to said second mailbox address, said forwarded electronic mail message including a header message stating that the message was forwarded from the first mailbox and that the second mailbox address will be communicated to the originator; and
   transmitting a second electronic mail message to said originator at said sending host system in response to said forwarding, wherein said second electronic mail message includes said second mailbox address.

2. The method of claim 1 wherein said second mailbox address is located on a second receiving host system.

3. The method of claim 1 wherein said first mailbox is provided by a first Internet service provider and said second mailbox is provided by said second Internet service provider.

4. The method of claim 1 wherein said first mailbox and said second mailbox are provided by said second Internet service provider.

5. The method of claim 1 wherein said forwarding is performed within a pre-selected time interval of said receiving.

6. The method of claim 5 wherein said pre-selected time interval is one minute.

7. The method of claim 1 wherein said forwarding includes notifying said recipient at said second mailbox address that said forwarding has occurred.

8. The method of claim 1 wherein said originator is an individual.

9. The method of claim 1 wherein said originator is a SPAM originator.

10. The method of claim 1 wherein said first user interface screen and said second user interface screen are combined into a single user interface screen.

11. A system for selectively forwarding electronic-mail, the system comprising:
    a network;
    a storage device in communication with said network;
    a first user system in communication with said network;
    a sending host system in communication with said network;
    a second receiving host system in communication with said network; and
    a first receiving host system in communication with said network, said first receiving host system including application software to implement a method comprising:
       receiving a first electronic mail message at said first receiving host system from an originator on said first user system in communication with said sending host system via the network, wherein said first electronic mail message is addressed to a recipient at a first mailbox on said first receiving host system;
       searching a transfer list located on said storage device for said first mailbox and a corresponding second mailbox address in response to a determination that said first mailbox is not active on said first receiving host system, wherein said transfer list includes said first mailbox and said corresponding second mailbox address if said recipient had requested that said first mailbox and said corresponding second mailbox address be added to said transfer list via a first user interface screen from a second Internet service provider;

analyzing forwarding instructions located on said storage device to determine if said first electronic mail message should be forwarded to said second mailbox address at said second receiving host system, wherein said analyzing is performed in response to said first mailbox and said second mailbox address being located on said transfer list, and said forwarding instructions were created by said recipient via a second user interface screen from said second Internet service provider;

the analyzing forwarding instructions being responsive to the identity of the originator of the first electronic mail message, wherein if the originator is not on a forwarding list the first electronic mail message is processed as if the recipient is not found, and if the originator is on the forwarding list the first electronic mail message is determined to be forwarded to the second mailbox address;

forwarding said first electronic mail message to said second mailbox address in response to said analyzing resulting in a determination that said first electronic mail message should be forwarded to said second mailbox address, said forwarded electronic mail message including a header message stating that the message was forwarded from the first mailbox and that the second mailbox address will be communicated to the originator; and transmitting a second electronic mail message to said originator at said sending host system in response to said forwarding, wherein said second electronic mail message includes said second mailbox address.

12. The system of claim 11 wherein said network includes the Internet.

13. The system of claim 11 wherein said network includes a public switched telephone network.

14. The system of claim 11 wherein said network includes a wireless network.

15. The system of claim 11 wherein said first receiving system is provided by a first Internet service provider and said second receiving system is provided by said second Internet service provider.

16. The system of claim 11 wherein said first receiving system and said second receiving system are provided by said second Internet service provider.

17. The system of claim 11 wherein said first receiving system and said second receiving system are the same system.

18. The system of claim 11 wherein said application software includes a purchased electronic-mail application system.

19. The system of claim 11 wherein said searching and said analyzing are performed by application software located on said second receiving system.

20. The system of 11 further comprising a second user system in communication with said second receiving system via said network and wherein said searching and said analyzing are performed by application software located on said second user system.

21. A storage medium encoded with machine readable computer program code for selectively forwarding electronic mail, the storage medium including instructions for causing a processing circuit to implement a method comprising:

receiving a first electronic mail message at a first receiving host system from an originator at a sending host system, wherein said first electronic mail message is addressed to a recipient at a first mailbox on said first receiving host system;

searching a transfer list for said first mailbox and a corresponding second mailbox address in response to a determination that said first mailbox is not active on said first receiving host system, wherein said transfer list includes said first mailbox and said corresponding second mailbox address if said recipient had requested that said first mailbox and said corresponding second mailbox address be added to said transfer list via a first user interface screen from a second Internet service provider;

analyzing forwarding instructions to determine if said first electronic mail message should be forwarded to said second mailbox address, wherein said analyzing is performed in response to said first mailbox and said second mailbox address being located on said transfer list, and said forwarding instructions were created by said recipient via a second user interface screen from said second Internet service provider;

the analyzing forwarding instructions being responsive to the identity of the originator of the first electronic mail message, wherein if the originator is not on a forwarding list the first electronic mail message is processed as if the recipient is not found, and if the originator is on the forwarding list the first electronic mail message is determined to be forwarded to the second mailbox address;

forwarding said first electronic mail message to said second mailbox address in response to said analyzing resulting in a determination that said first electronic mail message should be forwarded to said second mailbox address, said forwarded electronic mail message including a header message stating that the message was forwarded from the first mailbox and that the second mailbox address will be communicated to the originator; and transmitting a second electronic mail message to said originator at said sending host system in response to said forwarding, wherein said second electronic mail message includes said second mailbox address.

\* \* \* \* \*